United States Patent [19]

Ohno et al.

[11] Patent Number: 5,322,352
[45] Date of Patent: Jun. 21, 1994

[54] ELECTRIC VEHICLE REGENERATIVE AND FRICTION BRAKING CONTROL SYSTEM

[75] Inventors: Atsuo Ohno; Nobuyoshi Asanuma; Hideki Toyota, all of Wako, Japan

[73] Assignee: Honda Giken Kogyo Kabushiki Kaisha, Tokyo, Japan

[21] Appl. No.: 893,175

[22] Filed: Jun. 3, 1992

[30] Foreign Application Priority Data

Jun. 3, 1991 [JP] Japan .................. 3-131254

[51] Int. Cl.$^5$ .......................................... B60L 7/10
[52] U.S. Cl. ...................................... 303/3; 188/156; 303/20
[58] Field of Search ............... 303/3, 15, 20, 93, 100; 188/1.11, 156, 159, 181 A, 181 C; 318/139, 371, 376; 364/426.01

[56] References Cited

U.S. PATENT DOCUMENTS

| | | | |
|---|---|---|---|
| 3,621,929 | 11/1971 | Oberthur et al. | 188/156 X |
| 4,270,806 | 6/1981 | Venkataperumal et al. | 303/3 |
| 4,494,199 | 1/1985 | Lehmann | 364/426.01 |
| 4,557,355 | 12/1985 | Wilke et al. | 188/173 |
| 4,671,577 | 6/1987 | Woods | 303/20 X |
| 4,819,992 | 4/1989 | Angelillo et al. | 303/20 |
| 5,146,408 | 9/1992 | Valentic | 303/103 X |
| 5,148,883 | 9/1992 | Tanaka et al. | 318/376 X |

Primary Examiner—Douglas C. Butler
Assistant Examiner—Josie A. Ballato
Attorney, Agent, or Firm—Lyon & Lyon

[57] ABSTRACT

A method of and an apparatus for controlling brakes suitable for use in an electric vehicle. Target deceleration is determined from the amount of depression of a brake pedal and the deceleration of the electric vehicle is detected. Then, the difference between the target deceleration and the deceleration of the electric vehicle is determined and a desired braking force for attaining the target deceleration is obtained. Thereafter, it is determined whether or not the difference falls within a predetermined range. It is further judged, based on the result of the determination, whether the operation of a regenerative brake is required to obtain the desired braking force. If the difference falls outside of the predetermined range, then the regenerative brake is inhibited from being actuated.

24 Claims, 7 Drawing Sheets

ELECTRIC VEHICLE REGENERATIVE AND FRICTION BRAKING CONTROL SYSTEM

BACKGROUND OF THE INVENTION

1. Field of the Invention

The present invention relates to a method of and an apparatus for controlling brakes which is suit able for use in an electric vehicle, wherein each of the brakes can efficiently be operated by controlling the braking ratio, or proportion of a regenerative braking function to a frictional braking function.

2. Description of the Related Art

In general, a regenerative brake is known which makes use of a regenerative operation of a drive motor and a mechanically-operated friction brake. An example of such a brake is a typical disk brake which is principally employed in an electric vehicle in order to decelerate the electric vehicle when running.

A regenerative brake is normally operated by lifting the foot off of an accelerator, whereas a friction brake is actuated by depressing a brake pedal. A battery is charged by feeding back or returning regenerative energy Produced by regenerative braking to the battery. In order to improve the efficiency of recovery, or withdrawal of the regenerative energy, it is necessary to cause the braking of the electric vehicle by the regenerative brake to take precedence over the braking of the electric vehicle by the friction brake. This has been disclosed in U.S. Pat. No. 3,621,929.

In a conventional brake control apparatus used for an electric vehicle, separate operation systems are provided for the regenerative brake and the friction brake, respectively as in the case where an accelerator pedal and a brake pedal are independently provided. Therefore, regenerative energy cannot efficiently be recovered. When the brake pedal is depressed, for example, the friction brake is applied to the vehicle so as to rapidly reduce the rotational speed of each of the wheels. Therefore, sufficient torque cannot be applied to the drive motor, which serves as a generator, so that recovery of the regenerative energy cannot efficiently be performed. At the same time, a sufficient braking force cannot be developed by the regenerative brake alone. Therefore, the braking of the vehicle is dependent almost entirely on the friction brake. In this case, any regenerative energy is radiated in the form of heat generated by the friction brake, so that it cannot be recovered. Accordingly, the effect of the regenerative energy cannot be enhanced.

SUMMARY OF THE INVENTION

It is a general object of the present invention to provide a method of and an apparatus for controlling brakes in an electric vehicle, wherein the recovery efficiency of regenerative energy generated by a regenerative brake can be improved, thereby ensuring that the energy of the battery can be conserved and further ensuring that the regenerative brake and the friction brake can be operated efficiently.

It is another object of the present invention to provide a method of controlling brakes, suitable for use in an electric vehicle, which comprises the following steps: a first step of determining a target deceleration from the amount of depression of a brake pedal, and detecting the deceleration of said electric vehicle; a second step of determining the difference between the target deceleration and said detected deceleration; a third step of determining a desired braking force for attaining the target deceleration; a fourth step of determining whether or not the difference falls within a predetermined range; and a fifth step of determining, based on the result of the determination in the fourth step, whether or not the actuation of a regenerative brake is required to obtain the desired braking force.

It is a further object of the present invention to provide a method of controlling brakes, suitable for use in an electric vehicle, wherein the fifth step includes a process for determining a braking force of the regenerative brake from the speed of the electric vehicle and a process for actuating only the regenerative brake when the braking force of the regenerative brake is larger than the desired braking force, and actuating both the regenerative brake and a friction brake when the braking force of the regenerative brake is smaller than the desired braking force.

It is a still further object of the present invention to provide a method of controlling brakes, suitable for use in an electric vehicle, further including a sixth step of inhibiting the regenerative brake from being operated when the difference falls outside of the predetermined range in the fifth step.

It is a still further object of the present invention to provide a method of controlling brakes, suitable for use in an electric vehicle, which comprises the following steps: a first step of determining a target deceleration from the amount of depression of a brake pedal, and detecting both the speed and the deceleration of the electric vehicle; a second step of determining a target front-wheel braking force and a target rear-wheel braking force from the target deceleration and determining a braking force of a regenerative brake associated with the speed of the vehicle; and a third step of setting each of the target front-wheel braking force, the target rear-wheel braking force and the braking force of the regenerative brake to a predetermined value so as to attain the target deceleration, whereby the regenerative brake and the friction brake are controlled based on the predetermined value.

It is a still further object of the present invention to provide a brake control apparatus, suitable for use in an electric vehicle, which comprises: speed detecting means for detecting the speed of the electric vehicle; deceleration detecting means for detecting the deceleration of the electric vehicle; displacement detecting means for detecting the amount of depression of a brake pedal, which is equivalent to the displacement thereof; target deceleration arithmetic means for computing a target deceleration from the displacement; braking-force-of-regenerative-brake arithmetic means for computing a braking force of the regenerative brake relative to the speed of the vehicle; target braking force arithmetic means for computing a target braking force associated with the target deceleration; braking-ratio setting means for setting the braking ratio of the regenerative brake to a friction brake based on the detected deceleration, the target deceleration, the braking force of the regenerative brake and the target braking force; regenerative brake controlling means for controlling the regenerative brake based on the braking ratio; and friction brake controlling means for controlling the friction brake based on the braking ratio.

It is a still further object of the present invention to provide a brake control apparatus wherein the displacement detecting means comprises a linear potentiometer displaced according to the amount of the depression of the brake pedal.

It is a still further object of the present invention to provide a brake control apparatus wherein the displacement detecting means comprises a rotary potentiometer coupled to a support shaft used to support the brake pedal thereon.

It is a still further object of the present invention to provide a brake control apparatus wherein the displacement detecting means comprises a differential transformer detector displaced according to the amount of the depression of the brake pedal.

It is a still further object of the present invention to provide a brake control apparatus wherein the target deceleration arithmetic means comprises a brake controller for computing a corresponding target deceleration from the relationship of the target deceleration to the displacement of the brake pedal, wherein the relationship is previously stored as data in a memory.

It is a still further object of the present invention to provide a brake control apparatus wherein the braking-force-of-regenerative-brake arithmetic means comprises a brake controller for computing a corresponding regenerative braking force from the relationship of the regenerative braking force to the speed of the electric vehicle, wherein the relationship is previously stored as data in the memory.

It is a still further object of the present invention to provide a brake control apparatus wherein the target braking force arithmetic means comprises a brake controller for performing an arithmetic operation on each target braking force from the relationship between an ideal front-wheel braking force and an ideal rear-wheel braking force, wherein the relationship is previously stored as data in the memory.

It is a still further object of the present invention to provide a brake control apparatus wherein the braking-ratio setting means comprises a brake controller for comparing a braking force required to set the deceleration to the target deceleration with the regenerative braking force, and for activating only the regenerative brake controlling means when the required braking force is smaller than the regenerative braking force, and activating both the regenerative brake controlling means and the friction brake controlling means when the required braking force is larger than the regenerative braking force.

It is a still further object of the present invention to provide a brake control apparatus wherein the regenerative brake controlling means is activated to control a motor for driving the electric vehicle.

It is a still further object of the present invention to provide a brake control apparatus wherein the friction brake controlling means comprises a rear-wheel friction brake controller for controlling each rear-wheel brake employed in the electric vehicle and a front-wheel friction brake controller for controlling each front-wheel brake employed therein.

It is a still further object of the present invention to provide a method of controlling brakes suitable for use in an electric vehicle, comprising the step of determining a target deceleration from the amount of depression of a brake pedal, determining a current actual deceleration of the electric vehicle, determining the difference between the target deceleration and the actual deceleration, and actuating a regenerative brake only when the difference is less than a predetermined amount.

It is a still further object of the present invention to provide a method, wherein a friction brake is actuated when the difference is greater than the predetermined amount.

It is a still further object of the present invention to provide a method, wherein the steps of determining the target and actual decelerations and the difference therebetween is repeated rapidly and continuously during depression of the brake pedal.

It is a still further object of the present invention to provide a method, including a step of determining a braking force of the regenerative brake from the speed of the electric vehicle and actuating only the regenerative brake when the braking force of the regenerative brake is larger than a desired vehicle braking force.

It is a still further object of the present invention to provide a method, including a step of determining a braking force of the regenerative brake and actuating both the regenerative brake and a friction brake when the braking force of the regenerative brake is smaller than a desired vehicle braking force.

It is a still further object of the present invention to provide a method, including the steps of determining a target front-wheel braking force and a target rear-wheel braking force from the target deceleration and determining a braking force of a regenerative brake, and setting each of the target front-wheel braking force, the target rear-wheel braking force and the braking force of the regenerative brake to a predetermined value so as to attain the target deceleration whereby friction brakes on the front and rear wheels and the regenerative brake are controlled based on the predetermined values.

It is a still further object of the present invention to provide a method of controlling vehicle brakes comprising the steps of determining an actual deceleration of the vehicle, determining a target deceleration of the vehicle in response to actuation of a brake pedal in the vehicle, determining a difference in the actual deceleration and the target deceleration, controlling the vehicle brakes in response to the difference.

It is a still further object of the present invention to provide a method, wherein the vehicle brakes include a friction braking system and a regenerative braking system, both of which are controlled in response to the difference.

It is a still further object of the present invention to provide a method, wherein the step of determining the difference is performed by a digital microprocessor.

It is a still further object of the present invention to provide a method, wherein the step of determining the difference is performed repeatedly substantially every 10 milliseconds in response to the actuation of the brake pedal.

It is a still further object of the present invention to provide an apparatus for controlling an electric vehicle, comprising, a brake pedal, a first sensor coupled to the brake pedal, a second sensor disposed to measure actual deceleration of the vehicle, a friction braking system provided for wheels of the vehicle, a regeneration braking system provided on the vehicle, a processor coupled to the first sensor, the second sensor, the friction braking system, and the regeneration braking system, the processor including means for controlling the friction braking system and the regeneration braking system in response to the first sensor and the second sensor.

It is a still further object of the present invention to provide an apparatus, wherein the processor comprises means for calculating a panic stopping condition of the vehicle in response to the first and second sensors and applying only the friction braking system.

It is a still further object of the present invention to provide an apparatus, wherein the processor includes means for controlling the friction braking system and the regeneration braking system in a first manner in response to a first braking condition of the vehicle and in a second manner in response to a second braking condition of the vehicle, the first and second braking conditions being dependent on values detected by the first and second sensors.

It is a still further object of the present invention to provide an apparatus, wherein the first manner comprises disabling the regeneration braking system and wherein the second manner comprises enabling the regeneration braking system.

The above and other objects, features and advantages of the present invention will become apparent from the following description and the appended claims, taken in conjunction with the accompanying drawings in which a preferred embodiment of the present invention is shown by way of illustrative example.

DETAILED DESCRIPTION OF THE PREFERRED EMBODIMENTS

Figure 1:
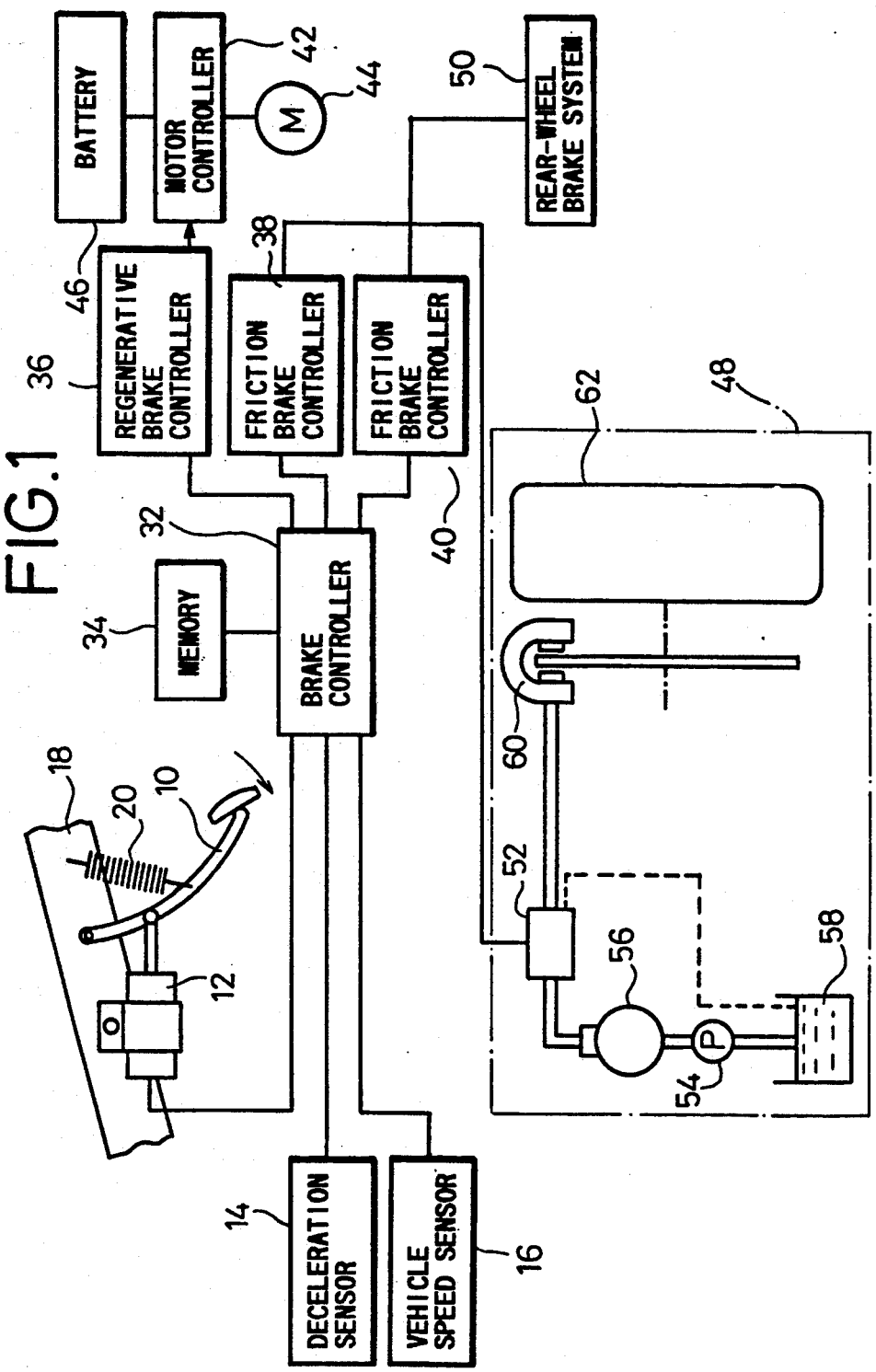
FIG. 1 is a block diagram showing the structure of a brake control apparatus according to one embodiment of the present invention, which is suitable for use in an electric vehicle.

FIG. 1 is a block diagram showing the structure of a brake control apparatus according to one embodiment of the present invention, which is suitable for use in an electric vehicle. The electric vehicle on which the brake control apparatus is mounted is provided with an amount-of-depression-of-brake-pedal detector, i.e., a displacement detector 12 for detecting the displacement or the amount of depression of a brake pedal 10 by a driver. The vehicle also includes a deceleration sensor 14 for detecting a decreasing speed or deceleration of the electric vehicle, and a vehicle speed sensor 16 for detecting the running speed of the electric vehicle.

Figure 3:
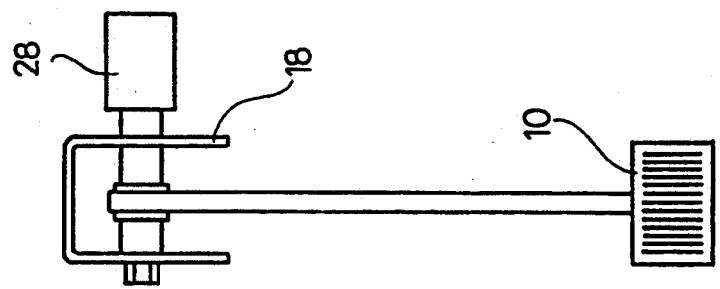
FIG. 3 is a diagram for describing another example of the displacement detector mounted on the brake pedal shown in FIG. 1.
Figure 2:
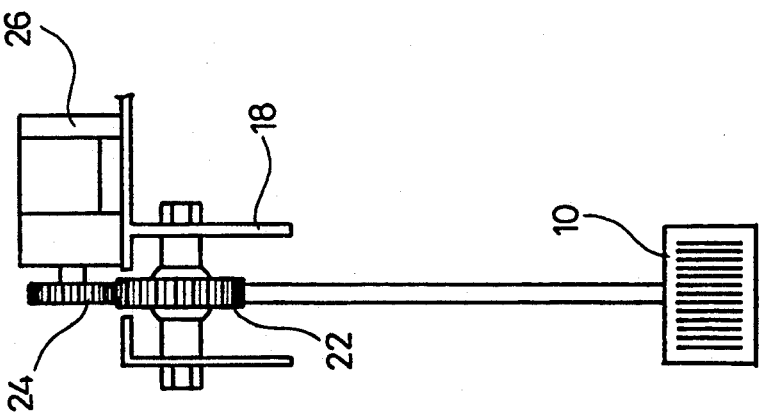
FIG. 2 is a diagram for describing one example of a displacement detector mounted on a brake pedal of the electric vehicle, which is illustrated in FIG. 1.
Figure 4:
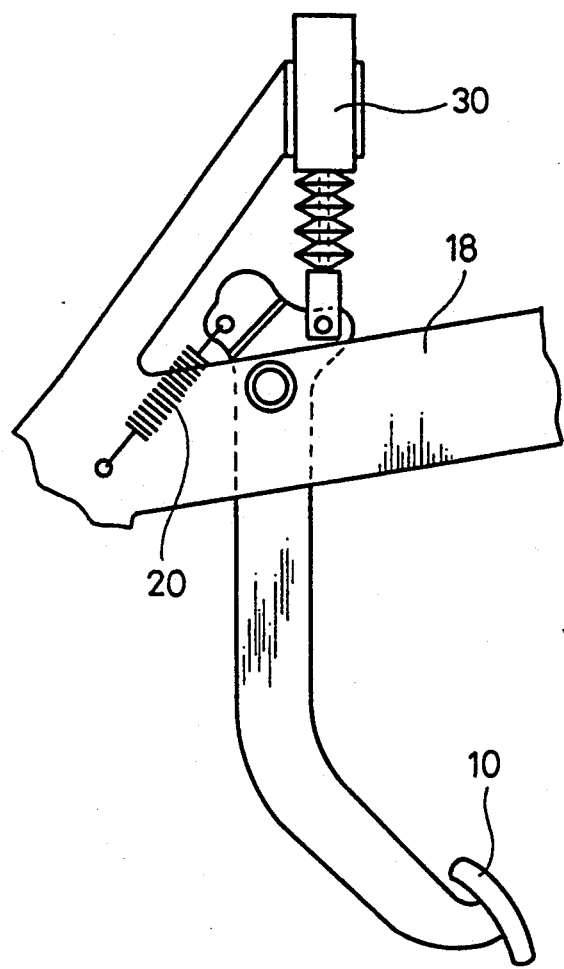
FIG. 4 is a diagram for describing a further example of the displacement detector mounted on the brake pedal depicted in FIG. 1.

The displacement detector 12 is mounted on a bracket 18 on which the brake pedal 10 is also angularly rotatably mounted. The displacement detector 12 detects the amount of depression of the brake pedal 10, which is displaced against a tensile force of a spring 20 which applies a restoring force to the brake pedal 10. The displacement detector 12 comprises either a linear potentiometer or a differential transformer. As illustrated in FIG. 2, the displacement detector 12 may also comprise a rotary potentiometer 26 fixed to the bracket 18, for detecting the amount of rotation of a gear 22 mounted on a support shaft of the brake pedal 10 through a gear 24. Further, as shown in FIG. 3, the displacement detector 12 may comprise a rotary potentiometer 28 fixed to a bracket 18 and directly coupled to the support shaft of the brake pedal 10, so as to detect the amount of angular displacement thereof. Furthermore, the displacement detector 12 may be a differential-transformer type displacement detector 30 substantially vertically attached to one end of the brake pedal 10 which is rotatably mounted on a bracket 18, as illustrated in FIG. 4.

As the deceleration sensor 14, there may be employed known type for detecting the output of a strain gauge affixed to a cantilever beam, for example. The deceleration sensor 14 may be disposed in such a manner that both the acceleration and the deceleration in a direction in which the electric vehicle travels can be detected.

Referring to FIG. 1, the amount of depression of the brake pedal 10 detected by the displacement detector 12, the deceleration detected by the deceleration sensor 14, and the speed of the electric vehicle detected by the vehicle sensor 16 are transmitted to a brake controller 32, which may comprise a processor such as a digital microprocessor. As will be described later, the brake controller 32 sets and controls the braking ratio or, in other words, the proportion of a regenerative brake to a friction brake. The brake controller 32 serves as each of a target deceleration arithmetic means for computing a target deceleration, a braking-force-of-regenerative-brake arithmetic means for computing a braking force of the regenerative brake, a target braking force arithmetic means for computing a target braking force, and a braking-ratio setting means for setting the braking ratio or proportion of the regenerative brake to the friction brake. A memory 34 for storing therein data used to set the braking ratio is electrically connected to the brake controller 32. In addition, a regenerative brake controller 36 and friction brake controllers 38, 40 are connected to the brake controller 32.

The regenerative brake controller 36 is activated to control a motor controller 42 to thereby drive a motor 44 for applying regenerative braking to the electric vehicle. The motor 44 is driven by a batter 46 to which the regenerative energy of the motor 44 is resupplied during regenerative braking.

The friction brake controller 38 controls a front-wheel brake system 48. The friction brake controller 40 controls a rear-wheel brake system 50. The front-wheel brake system 48 and the rear-wheel brake system 50 are identical in structure to each other. A description will therefore be made of only the front-wheel brake system 48. The front-wheel brake system 48 has a linear solenoid valve 52, which controls the flow of brake oil 58 stored under pressure in an accumulator 56. The brake oil is supplied to a disk brake 60 via a pump 54 in response to a control signal output from the friction brake controller 38. Thus, braking of each of the wheels 62 by friction is carried out.

The brake control apparatus according to the present embodiment, which is used for the electric vehicle, is basically constructed as described above. A brake controlling method using the brake control apparatus will now be described based on the flowcharts shown in FIGS. 5 and 6.

When the driver first depresses the brake pedal 10, the displacement detector 12 detects the amount of depression of the brake pedal 10 as a displacement S and supplies it to the brake controller 32. On the other hand, the deceleration sensor 14 detects and applies a deceleration g to the brake controller 32, whereas the vehicle sensor 16 transmits a vehicle speed v during the reduction in speed to the brake controller 32 (Step S1).

Figure 7:
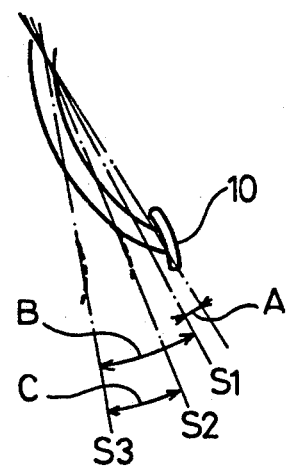
FIG. 7 is a diagram for describing the amount of depression of the brake pedal in the brake control apparatus shown in FIG. 1.
Figure 8:
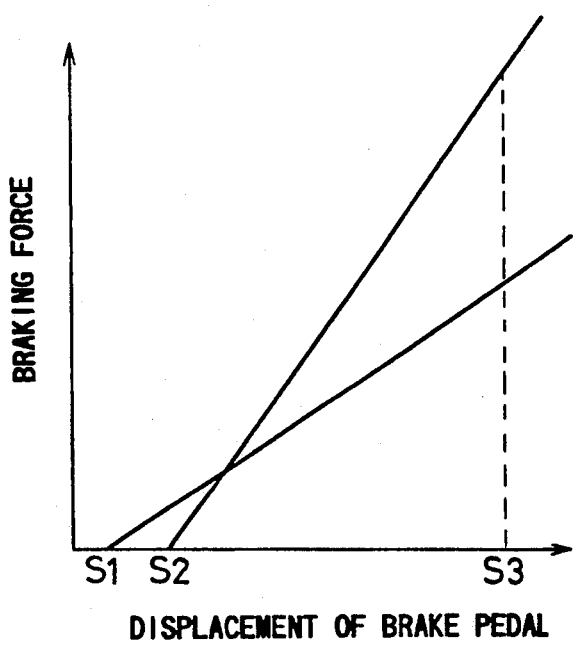
FIG. 8 is a diagram for describing the relationship between the amount of depression of a brake pedal and the braking forces of a regenerative brake and a friction brake, respectively.
Figure 9:
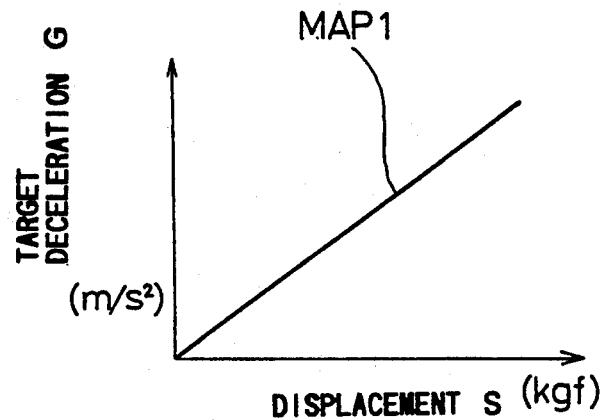
FIG. 9 is a diagram for describing the relationship between the amount of depression of a brake pedal and a target deceleration.
Figure 10:
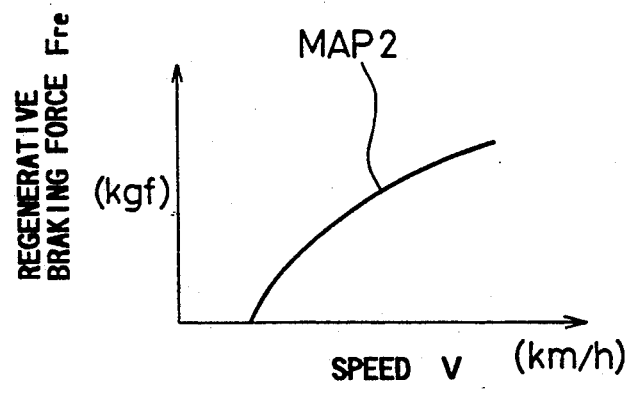
FIG. 10 is a diagram for describing the relationship between the speed and the regenerative braking force of the electric vehicle.
Figure 11:
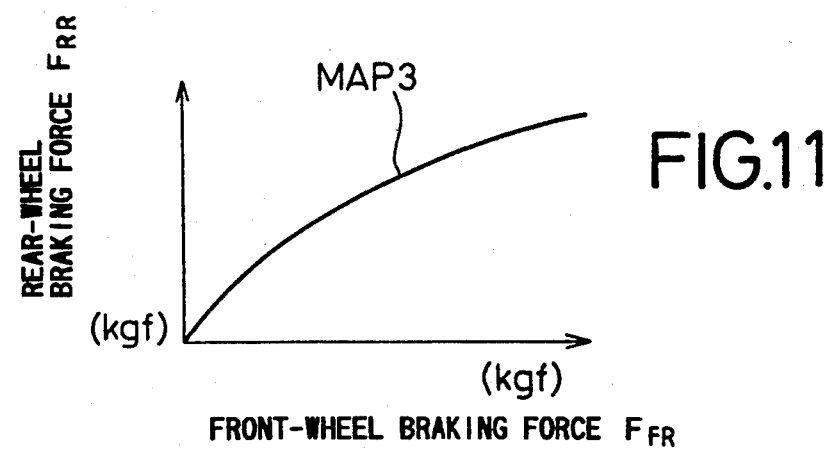
FIG. 11 is a diagram for describing the relationship between an ideal front-wheel braking force and an ideal rear-wheel braking force.

As shown in FIG. 7, regions corresponding to the displacement S of the brake pedal 10 are represented as a play or clearance area A ($0<S<S1$) at which no braking force is produced, an area B ($S1<S<S3$) at which the regenerative braking is actuated, and an area C ($S2<S<S3$) at which both regenerative brake and the friction brake are operated. The relationship between the displacement S and the respective braking forces of the regenerative brake and the friction brake are illustrated in FIG. 8. By making use of the above relationship, the relationship of a target deceleration G to the displacement S (a converted value equivalent to the amount of depression) is represented as a curve "MAP1" in FIG. 9. The relationship of a regenerative braking force $F_{re}$ to the speed v of the electric vehicle is represented as a curve "MAP2" in FIG. 10, and the relationship of an ideal front-wheel braking force $F_{FR}$ to an ideal rear-wheel braking force $F_{RR}$ is represented as a curve "MAP3" in FIG. 11. These relationships are stored in the memory 34 as respective MAP data.

The brake controller 32 determines the target deceleration G from the displacement S of the brake pedal 10 using the MAP1 data (see FIG. 9) stored in the memory 34 (Step S2). Then, the brake controller 32 calculates a braking force F required to achieve the target deceleration G by using the deceleration g detected by the deceleration sensor 14 and the target deceleration G, and further determines the ideal front-wheel braking force $F_{FR}$ and the ideal rear-wheel braking force $F_{RR}$ from the MAP3 data (see FIG. 11) stored in the memory 34.

Next, the target deceleration G is compared with the actual deceleration g (Step S4). When the absolute value of the difference between the target deceleration G and the actual deceleration g is 0.3 or smaller, for example, it is unnecessary for the driver to apply a large braking force. At this time, the brake controller 32 determines the regenerative braking force $F_{re}$ of the regenerative brake from the present speed v of the electric vehicle by making use of the MAP2 data (see FIG. 10) stored in the memory 34, and then determines a regenerative braking force $F_{Fre}$ of each front wheel and a regenerative braking force $F_{Rre}$ of each rear wheel (Step S5).

In this case, the following equations are established in a four-wheel drive vehicle driven by a single motor. That is, $F_{re}=F_{Fre}+F_{Rre}$ and $F_{Fre}=F_{Rre}$. In a front-wheel drive vehicle, the following equations are set up. That is, $F_{Rre}=0$ and $F_{re}=F_{Fre}$. Further, the following equations are established in a rear-wheel drive vehicle. That is, $F_{Fre}=0$ and $F_{re}=F_{Rre}$. The present embodiment will be described below in accordance with these relations.

The regenerative braking force $F_{re}$ is first compared with the required braking force F determined in Step S3 (Step S6). If $F<F_{re}$, then the required braking force F is set to the regenerative braking force $F_{re}$ because the braking of the electric vehicle can sufficiently be carried out by the regenerative brake alone. In addition, a hydraulic front-wheel braking force $F_{FB}$ with respect to the front-wheel brake system 48 and a hydraulic rear-wheel braking force $F_{RB}$ with respect to the rear-wheel brake system 50 are set to 0 respectively (Step S7). Then, the brake controller 32 instructs the regenerative brake controller 36 to effect a braking operation (Step S8).

At this time, the regenerative brake controller 36 supplies a control signal corresponding to the regenerative braking force $F_{re}$ to the motor controller 42, thereby performing the regenerative braking of the motor 44. At this time, each of the front-wheel brake system 48 and the rear-wheel brake system 50 is in an inactivated state. Accordingly, the regenerative energy generated by the motor 44 is efficiently restored or accumulated in the battery 46.

On the other hand, if it is determined that F is greater than or equal to $F_{re}$ (i.e. $F \geq F_{re}$) in S6, then the required braking force F cannot be obtained by the regenerative brake alone. It is therefore necessary to supplement the required braking force F by front-wheel and rear-wheel braking forces.

Therefore, the ideal front-wheel braking force $F_{FR}$ is first compared with the front-wheel regenerative braking force $F_{Fre}$ (Step S9). If $F_{FR}<F_{Fre}$, then $F_{RB}$ is set to be equal to $F-F_{Fre}$ (i.e., $F_{RB}=F-F_{Fre}$) From this equation, the hydraulic rear-wheel braking force $F_{RB}$ is determined and the hydraulic front-wheel braking force $F_{FB}$ is maintained at zero (Step S10). Then, the brake controller 32 instructs the regenerative brake controller 36 and the rear-wheel brake system 50 to effect braking operations (Step S8). At this time, the regenerative brake controller 36 outputs a control signal corresponding to the regenerative braking force $F_{re}$ to the motor controller 42, thereby carrying out the regenerative braking of the motor 44. On the other hand, the friction brake controller 38 supplies a control signal corresponding to the hydraulic rear-wheel braking force $F_{RB}$ to the linear solenoid valve 52 of the rear-wheel brake system 50, thereby driving the disk brake 60 and applying a braking force thereof to each wheel 62. Since the regenerative brake is sufficiently operated at this time, the abrasion of the disk brake 60 in the rear-wheel brake system 50 can be minimized.

If $F_{FR} \geq F_{Fre}$ in Step S9, then the ideal rear-wheel braking force $F_{RR}$ is compared with the rear-wheel regenerative braking force $F_{Rre}$ (Step S11). If $F_{RR}<F_{Rre}$, $F_{FB}$ is then set to equal to $F-F_{Rre}$ (i.e., $F_{FB}=F-F_{Rre}$). From this equation, the hydraulic front-wheel braking force $F_{FB}$ is determined and hydraulic rear-wheel braking force $F_{RB}$ is maintained at zero (Step S12). In the same manner as described above, the brake controller 32 instructs the regenerative brake controller 36 and the front-wheel brake system 48 to carry out braking operations (Step S8).

If, on the other hand, $F_{RR} \geq F_{Rre}$ in Step S11, then $F_{FB}$ is set to be equal to $F_{FR}-F_{Fre}$ (i.e., $F_{FB} = F_{FR} - F_{Fre}$) and $F_{RB}$ is set to be equal to $F_{RR} - F_{Rre}$ (i.e., $F_{RB} = F_{RR} - F_{Rre}$) (Step S13). Further, the brake controller 32 instructs the regenerative brake controller 36, the front-wheel brake system 48 and the rear-wheel brake system 50 to effect braking operations (Step S8).

When the difference between the target deceleration G and the actual deceleration g is large (e.g.), greater than 0.3 g) in Step S4, a "panic stopping" condition has occurred, and it is necessary to apply a large braking force. In this case, a judgement is made, at that point in time, as to whether regenerative braking is applied or not (Step S14). In the case that regenerative braking is to be applied ($F_{re} > 0$), in order to raise responsiveness, the regenerative braking force $F_{re}$ is set to zero (Step S15) and the ideal front-wheel braking force $F_{FR}$ and the ideal rear-wheel braking force $F_{RR}$ are set to the hydraulic front-wheel braking force $F_{FB}$ and the hydraulic rear-wheel braking force $F_{RB}$ respectively (Step S16), after which they are supplied to the corresponding front-wheel brake system 48 and the rear-wheel brake system 50 respectively. On the other hand, in the case that regenerative braking is not to be applied, the routine procedure skips over Step S15, and Step S16 is executed. In any event, the braking of each of the front-wheel brake system 48 and the rear-wheel brake system 50 is effected. Thus, the deceleration of the electric vehicle can reliably be carried out.

Figure 5:
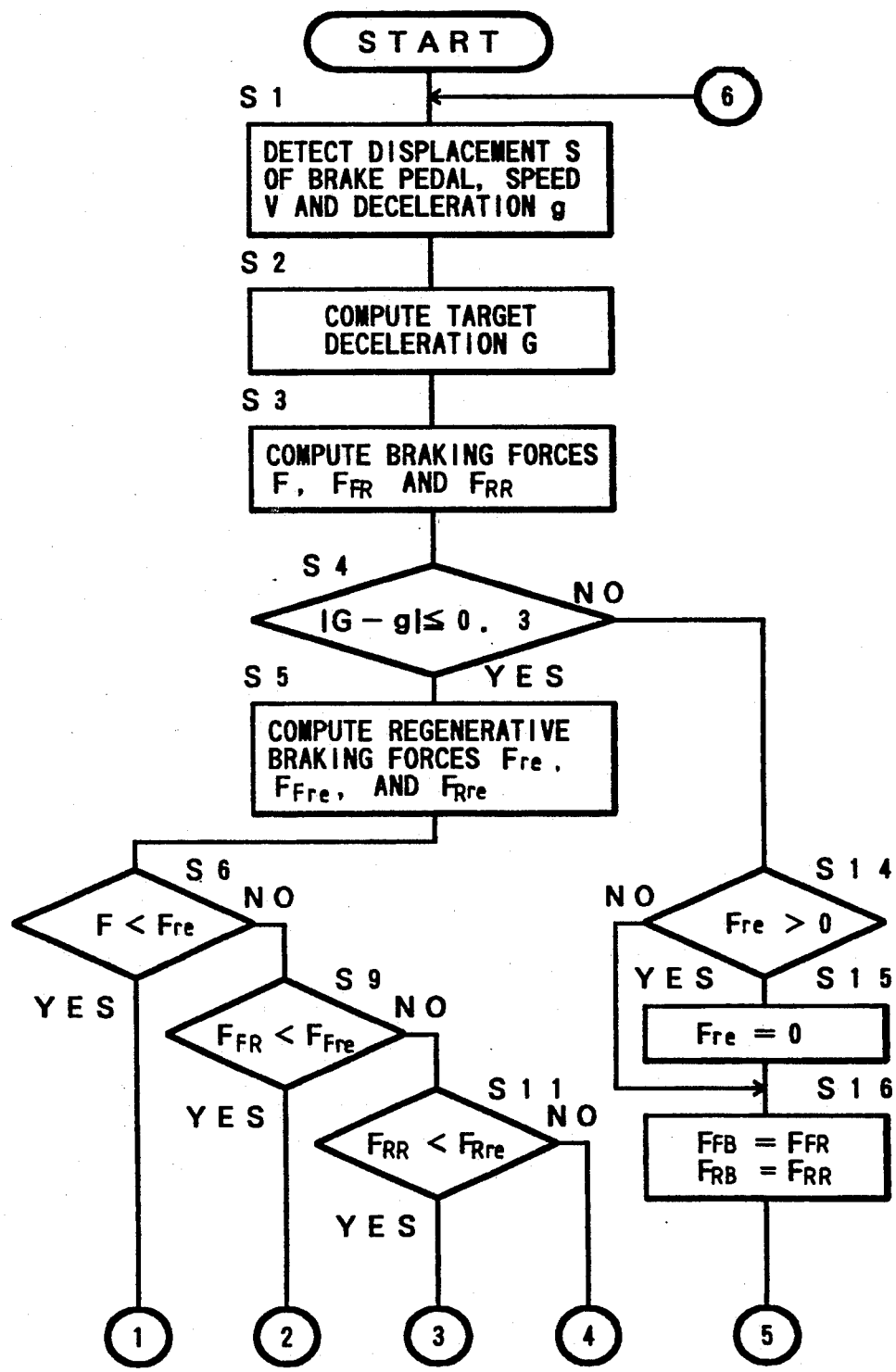
FIG. 5 is a flowchart for describing a processing sequence of a method of controlling each brake for the electric vehicle according to the present invention.
Figure 6:
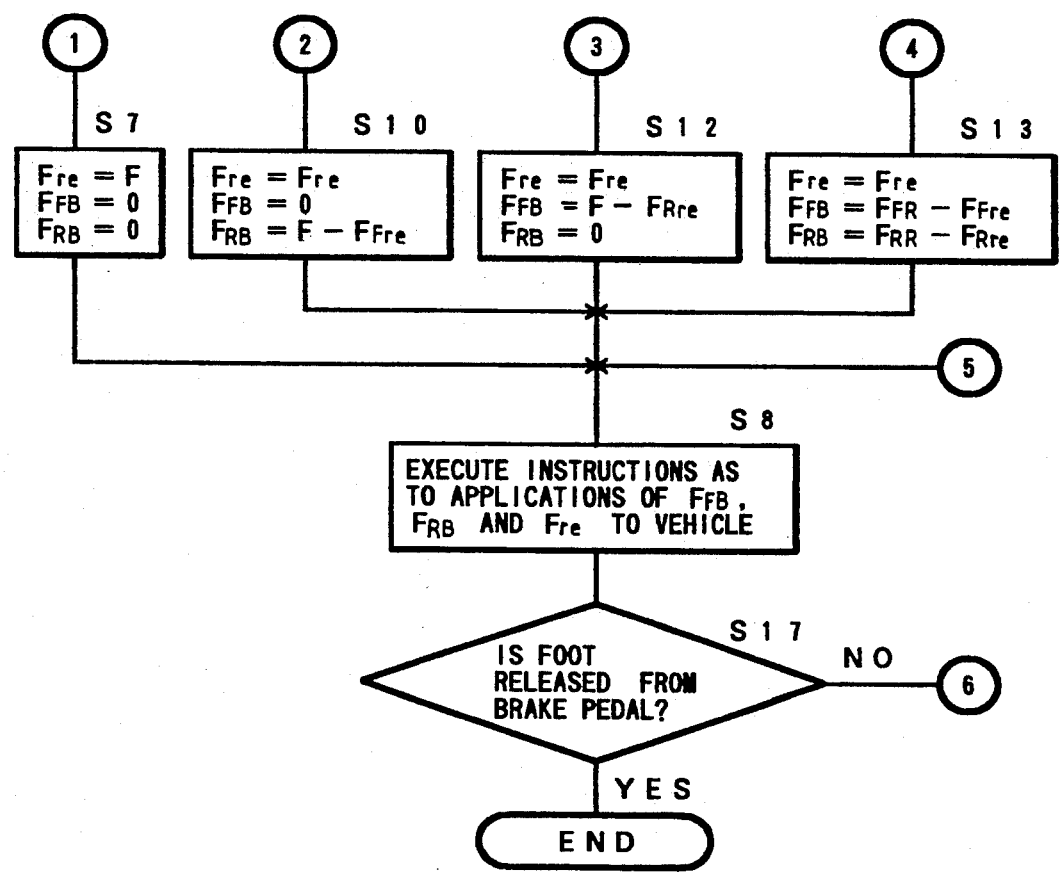
FIG. 6 is a flowchart for describing another processing sequence of the brake controlling method according to the present invention.

The above operations are carried out until the deceleration process is completed. Preferably, the operations are carried out by microprocessor and the Steps S1 through S17 of FIGS. 5 and 6 are continuously and rapidly repeated such as every ten (10) milliseconds. All the processes are completed by releasing the brake pedal 10, that is, when the brake pedal is no longer depressed by the driver, for example (Step S17).

Incidentally, the above-described embodiment is directed to a four-wheel drive vehicle driven by one motor. However, the present invention can also be applied to a four-wheel drive vehicle of a type wherein four motors are separately driven.

The method of and the apparatus for controlling brakes used in an electric vehicle, according to the present invention, can bring about the following advantageous effects.

That is, the braking proportion or ratio of the regenerative brake to the friction brake is automatically set according to the degree of braking made by the driver. When the braking of the electric vehicle is sufficiently carried out by the regenerative brake alone, for example, the regenerative energy produced by operating only the regenerative brake can efficiently be stored in the battery. As a result, the running distance of the electric vehicle can be lengthened. In addition, the degree of contribution of the friction brake to overall braking can be minimized, thereby making it possible to reliably avoid wearing of the friction brake itself.

Having now fully described the invention, it will be apparent to those skilled in the art that many changes and modifications can be made without departing from the spirit or scope of the invention as set forth herein.

What is claimed is:

1. A method of controlling brakes for use in an electric vehicle, said vehicle having both a regenerative brake and a friction brake, comprising the steps of:
   determining a target deceleration from an amount of depression of a brake pedal, and detecting an actual deceleration of said electric vehicle;
   determining a difference between said target deceleration and said actual deceleration;
   determining a desired braking force for attaining said target deceleration;
   determining whether or not said difference falls within a predetermined range; and
   determining whether or not an actuation of the regenerative brake is required to obtain said desired braking force based on whether said difference falls within said predetermined range;
   determining a braking force of said regenerative brake from a speed of said electric vehicle;
   actuating said regenerative brake only when the determined braking force of said regenerative brake is larger than said desired braking force, and actuating both said regenerative brake and said friction brake when the determined braking force of said regenerative brake is smaller than said desired braking force.

2. A method according to claim 1, further including a step of inhibiting said regenerative brake from being operated when said difference falls outside of said predetermined range.

3. A method of controlling brakes for use in an electric vehicle, said electric vehicle having both a regenerative brake and a friction brake, comprising the steps of:
   determining a target deceleration from an amount of depression of a brake pedal, and detecting both a speed and a deceleration of said electric vehicle;
   determining a target front-wheel braking force and a target rear-wheel braking force from said target deceleration, and determining a braking force of the regenerative brake associated with said speed; and
   setting each of said target front-wheel braking force, said target rear-wheel braking force and said braking force of said regenerative brake to a predetermined value so as to attain said target deceleration;
   whereby said regenerative brake and said friction brake are controlled based on said predetermined value.

4. A brake control apparatus for use in an electric vehicle, said electric vehicle having both a regenerative brake and a friction brake, comprising
   speed detecting means for detecting a speed of said electric vehicle;
   deceleration detecting means for detecting a deceleration of said electric vehicle;
   displacement detecting means for detecting a displacement of said brake pedal;
   target deceleration arithmetic means for computing a target deceleration from said displacement;
   braking-force-of-regenerative-brake arithmetic means for computing a regenerative braking force associated with said target deceleration;
   braking-ratio setting means for setting a braking ratio of said regenerative braking force to a friction braking force in response to said detected deceleration, said target deceleration, and said regenerative braking force;
   regenerative brake controlling means for controlling said regenerative brake in response to said braking ratio;
   friction brake controlling means for controlling said friction brake in response to said braking ratio.

5. A brake control apparatus according 4, wherein said displacement detecting means comprises a linear potentiometer displaced according to the amount of the depression of the brake pedal.

6. A brake control apparatus according to claim 4, wherein said displacement detecting means comprises a rotary potentiometer coupled to a support shaft used to support the brake pedal thereon.

7. A brake control apparatus according to claim 4, wherein said displacement detecting means comprises a differential transformer detector displaced according to the amount of the depression of the brake pedal.

8. A brake control apparatus according to claim 4, wherein said target deceleration arithmetic means comprises a brake controller for computing a corresponding target deceleration from a relationship of said target to the displacement of the brake pedal being previously stored as data in a memory.

9. A brake control apparatus according to claim 4, wherein said braking-force-of-regenerative-brake arithmetic means comprises a brake controller for computing corresponding regenerative braking force from a relationship of the regenerative braking force to the speed of said electric vehicle, said relationship being previously stored as data in a memory.

10. A brake control apparatus according to claim 4, wherein said target deceleration arithmetic means comprises a brake controller for performing an arithmetic operation on each target deceleration from a relationship between an ideal front-wheel braking force and an ideal rear-wheel braking force, said relationship being previously stored as data in a memory.

11. A brake control apparatus according to claim 4, wherein said braking-ratio setting means comprises a brake controller for comparing a braking force required to set said deceleration to said target deceleration with said regenerative braking force, and for activating only said regenerative brake controlling means when said required braking force is smaller than said regenerative braking force, and for activating both said regenerative brake controlling means and said friction brake controlling means when said required braking force is larger than said regenerative force.

12. A brake control apparatus according to claim 4, wherein said regenerative brake controlling means is activated to control a motor for driving the electric vehicle.

13. A brake control apparatus according to claim 4, wherein said friction brake controlling means comprises a rear-wheel friction brake controller for controlling each rear-wheel brake employed in the electric vehicle and a front-wheel friction brake controller for controlling each front-wheel brake employed therein.

14. A method of controlling brakes for use in an electric vehicle, said vehicle having both a regenerative brake and a friction brake, comprising the steps of:
    determining a target deceleration from an amount of depression of a brake pedal;
    determining a current actual deceleration of said electric vehicle;
    determining a difference between said target deceleration and said actual deceleration; and
    actuating said regenerative brake only when said difference is less than a predetermined amount, and actuating, said friction brake when said difference is greater than said predetermined amount.

15. A method according to claim 14, wherein the steps of determining the target and actual decelerations and the difference therebetween is repeated rapidly and continuously during depression of the brake pedal.

16. A method according to claim 14, including a step of determining a braking force of said regenerative brake from a speed of said electric vehicle and actuating only said regenerative brake when the braking force of said regenerative brake is larger than a desired vehicle braking force.

17. A method according to claim 14, including a step of determining a braking force of said regenerative brake and actuating both said regenerative brake and said friction brake when the braking force of said regenerative brake is smaller than a desired vehicle braking force.

18. A method according to claim 14, further including the steps of determining a target front-wheel braking force and a target rear-wheel braking force from said target deceleration and determining a braking force of said regenerative brake, and setting each of said target front-wheel braking force, said target rear-wheel braking force and said braking force of said regenerative brake to a predetermined value so as to attain said target deceleration whereby friction brakes on the front and rear wheels and said regenerative brake are controlled based on said predetermined values.

19. A method as in claim 14, wherein said step of determining said difference is performed by a digital microprocessor.

20. A method as in claim 14, wherein said step of determining said difference is performed repeatedly substantially every 10 milliseconds in response to said depression of the brake pedal.

21. An apparatus for controlling an electric vehicle, comprising:
    a brake pedal;
    a first sensor coupled to said brake pedal;
    a second sensor disposed to measure actual deceleration of said vehicle;
    a friction braking system provided for wheels of said vehicle;
    a regeneration braking system provided on said vehicle;
    a processor coupled to said first sensor, said second sensor, said friction braking system, and said regeneration braking system, said processor including means for controlling said friction braking system and said regeneration braking system in response to said first sensor and said second sensor.

22. An apparatus as in claim 21, wherein said processor comprises means for calculating a panic stopping condition of said vehicle in response to said first and second sensors and applying only said friction braking system.

23. An apparatus as in claim 21, wherein said processor includes means for controlling said friction braking system and said regeneration braking system in a first manner in response to a first braking condition of said vehicle and in a second manner in response to a second braking condition of said vehicle, said first and second braking conditions being dependent on values detected by said first and second sensors.

24. An apparatus as in claim 23, wherein said first manner comprises disabling said regeneration braking system and wherein said second manner comprises enabling said regeneration braking system.

* * * * *